United States Patent Office 3,278,474
Patented Oct. 11, 1966

3,278,474
COPOLYMERS OF UNSATURATED ALDEHYDES AND QUATERNARY AMMONIUM COMPOUNDS, DERIVATIVES THEREOF, PREPARATION AND USE
Alan C. Nixon, Berkeley, Calif., Paul J. Berrigan, Niagara Falls, N.Y., and Paul H. Williams, Orinda, Calif., assignors to Shell Oil Company, New York, N.Y., a corporation of Delaware
No Drawing. Filed June 20, 1962, Ser. No. 203,710
14 Claims. (Cl. 260—29.4)

This invention relates to new copolymers and their preparation. More particularly, the invention relates to new copolymers of unsaturated aldehydes and quaternary ammonium compounds, to derivatives thereof, to the preparation of the copolymers and derivatives, and to the use of these copolymers and derivative products, particularly for the treatment of fibrous materials.

Specifically, the invention provides new and particularly useful high molecular weight copolymers comprising the product of polymerization of (1) an ethylenically unsaturated aldehyde, and preferably acrolein, and (2) an ethylenically unsaturated monomer possessing a quaternary ammonium group, such as, for example, allyl trimethyl ammonium chloride. This invention further provides a process for preparing the above-described copolymers.

The invention also provides valuable derivatives of the above-described polymers, and particularly water-soluble derivatives obtained by reacting the copolymers with sulfur dioxide-containing reactants, such as sulfurous acid, alkali metal bisulfites and the like.

As a further special embodiment, the invention provides a process for utilizing the above-noted water-soluble derivatives of the copolymers for the treatment of fibrous materials to improve properties such as wet strength, abrasion resistance and the like, which comprises impregnating the already formed fibrous material with an aqueous solution of the above-noted copolymers or derivatives, or alternatively utilizing the copolymers or derivatives during the preparation of the fibrous material.

Ordinary paper when wet loses its strength and is easily torn. In order to overcome this shortcoming, it has become common practice to treat the paper with a nitrogen-containing resin, such as urea- or melamine-formaldehyde resin, that can be subsequently cured to form an insoluble resin. While this method has imparted some improvement in wet strength, it still leaves much to be desired for use on a commercial basis. The wet strength provided by this method, for example, is not as high as required for many applications. In addition, the improvement in wet strength is only temporary and is lost after exposure to water. This has been found to be due in part to the fact that the cured nitrogen-containing resin is easily hydrolyzed, particularly in the presence of the acid curing agents remaining in the resin. Further, the paper treated by the above method does not have the desired dimensional stability, fold endurance and tear strength required for certain commercial applications. In some cases, attempts have been made to improve some of these properties by adding more nitrogen-containing resin, but this only tends to make the paper lose its customary feel, appearance and flexibility.

It is an object of the invention, therefore, to provide a new class of polymers of unsaturated aldehydes which are particularly useful as wet strength agents for paper. It is a further object to provide new polymers of unsaturated aldehydes and quaternary ammonium compounds, and a method for their preparation. It is a further object to provide new water-soluble copolymers of unsaturated aldehydes. It is a further object to provide new water-soluble anionic copolymers which are particularly useful for treating fibrous materials, such as paper, textiles, leather and the like. It is a further object to provide a method for treating fibrous materials, to improve their dimensional stability and wet strength. These and other objects of the invention will be apparent from the following detailed description thereof.

It has now been discovered that these and other objects may be accomplished by the new copolymers of the invention comprising the product of polymerization of (1) an unsaturated aldehyde, and preferably acrolein, and (2) an ethylenically unsaturated monomer possessing a quaternary ammonium group, such as, for example, allyl trimethyl ammonium chloride, and derivatives of these copolymers, and particularly the water-soluble derivatives obtained by reacting the copolymers with sulfur dioxide-containing compounds, such as sulfurous acid. It has been surprisingly found that these new copolymers and derivatives, and particularly those which have good water solubility are outstanding materials for treating fibrous materials as yarns, fibers, textile fabrics, paper and leather to improve their properties. The new water-soluble derivatives, for example, when applied in an aqueous medium to paper increase the wet strength and abrasion resistance of the paper.

The new copolymers and derivatives also find use in the formation of thermoplastic mold products, coating compositions, films and the like as described hereinafter.

The alpha,beta-ethylenically unsaturated aldehydes used in making the new copolymers comprise those monoaldehydes having an ethylenic group in an alpha, beta-position relative to the aldehyde group, such as, for example, acrolein and alpha- and beta-substituted acroleins, as methacrolein, alpha-ethylacrolein, alpha-butylacrolein, alpha-chloroacrolein, bata-phenylacrolein, alpha-decylacrolein, alpha-cyclohexylacrolein, crotonoaldehyde and the like. Preferred aldehydes to be employed in making the copolymers include the alpha, beta-monoethylenically unsaturated aldehydes containing from 3 to 12 carbon atoms and especially acrolein and the alpha- and beta-substituted acroleins where the substituent on the alpha and/or beta positions is an alkyl, cycloalkyl and aryl group containing no more than 8 carbon atoms. 2-alkenals containing up to 8 carbon atoms come under special consideration.

The monomers to be copolymerized with the unsaturated aldehydes comprise those monomers containing (1) a quaternary ammonium group, i.e., a group containing a quaternary nitrogen atom $$-\overset{|}{\underset{|}{N}}-$$

which is attached to carbon and which group bears a positive charge (2) an ethylenic group contained in the said positively charged quaternary ammonium compound, and (3) an anion. The ethylenic group can be in any portion of the quaternary ammonium group, but is preferably a terminal $CH_2=C=$ group. The compound preferably contains activating group or groups for addition polymerization, such as, for example, ester groups, ether groups, aromatic rings, and the like. The anion may be of any type either organic or inorganic or combination thereof, such as, for example, chloride, bromide, iodide, fluoride, nitrate, p-toluene sulfonate, phosphate, sulfate, methosulfate, chlorate, fluoborate, fluosilicate, sulfite, phosphite, persulfate, arsenate, hypophosphite, borate, selenate, thiosulfate, perchlorate, chromate, acetate, benzenesulfonate, thiocyanate, and the like.

Examples of the quaternary ammonium compounds include, among others, allyl trimethyl ammonium chloride, S-allyl thiuronium bromide, S-methyl(allyl thiuronium) methosulfate, diallyl dibutyl ammonium chloride, diallyl dimethyl ammonium methosulfate, dimethallyl diethyl ammonium methosulfate, diallyl dimethyl ammonium nitrate, S-allyl (allyl thiuronium) bromide, N-methyl(4-vinyl pyridinium) methosulfate, N-methyl(2-vinylpyridinium) methosulfate, 2(N-allyl dimethylammonium) ethyl methacrylate methosulfate, 2-(trimethylammonium) ethyl methacrylate nitrate, 2-(trimethylammonium) ethyl methacrylate p-toluenesulfonate, 2-(tributylammonium) butyl acrylate methosulfate, methallyl dimethyl o-vinylphenyl ammonium chloride, octyl diethyl m-vinylphenyl ammonium phosphate, beta-hydroxyethyl dipropyl p-vinylphenyl ammonium bromide, benzyl dimethyl 2-methyl-5-vinylphenyl ammonium phosphate, 3-hydroxypropyl diethyl vinylphenyl ammonium sulfates, octadecyl dimethyl vinylphenyl ammonium sulfonates, amyl dimethyl 3-methyl-5-vinylphenyl ammonium thiocyanate, tetra-(hydroxyethyl) butylene diammonium dichloride, carbovinyloxymethyl triethyl ammonium chloride, vinyloxyethyl triethyl ammonium chloride, N-butyl-5-ethyl-2-vinylpyridinium iodide, N-propyl-2-vinylquinolinium methylsulfate, allyl gamma-myristamidopropyl dimethyl ammonium chloride, methallyl gamma-caprylamidopropyl methyl ethyl ammonium bromide, allyl gamma-caprylamidopropyl methyl benzyl ammonium phosphate, ethallyl gamma-myristamidopropyl methyl alpha-naphthylmethyl ammonium chloride, allyl gamma-palmitamidopropyl ethyl hexyl ammonium sulfate, methallyl gamma-lauramidopropyl diamyl ammonium phosphate, propallyl gamma-oleamidopropyl methyl octadecyl ammonium chloride, allyl gamma-lauramidopropyl diethyl ammonium phosphate, methallyl gamma-caprylamidopropyl methyl beta'-hydroxyethyl ammonium bromide, allyl gamma-stearamidopropyl methyl dihydroxypropyl ammonium phosphate, methallyl gamma-stearamidopropyl bis(beta'-hydroxyethyl) ammonium sulfate, allyl gamma-lauramidopropyl benzyl beta'-hydroxyethyl ammonium chloride, methallyl gamma-abietamidopropyl hexyl gamma'-hydroxypropyl ammonium phosphate, and the like.

Particularly preferred quaternary ammonium compounds include those of the formula (1) 

wherein at least one R is a radical containing an ethylenic group, and preferably a hydrocarbon, ester or ether-containing radical, and the other R's are hydrocarbon or substituted hydrocarbon radicals, and X is an anion. Also preferred are those of the formula (2) 

wherein R is an organic radical containing an ethylenic group, and preferably a hydrocarbon, ester or ether-substituted hydrocarbon radical and $R_1$ is a hydrocarbon or substituted hydrocarbon radical and preferably a (3) 

radical wherein $R_2$ is preferably hydrocarbon. Other preferred monomers are those of formula (2) wherein R is hydrogen and $R_1$ is a radical containing an ethylenic linkage and preferably a radical of formula (3) wherein $R_2$ is an ethylenically unsaturated hydrocarbon.

The amount of the unsaturated aldehyde and the quaternary ammonium compound to be employed in making the new copolymers may vary within certain limits. The amount of the unsaturated aldehyde should be at least 5% by weight of the mixture and preferably not more than 99.5% by weight of the monomer mixture. Preferably, the unsaturated aldehyde varies from 30% to 98% by weight of the mixture and the quaternary ammonium compound makes up from 70% to 2% by weight of the mixture.

In some cases, it may be desirable to replace a portion of the quaternary ammonium compound with a similar ethylenically unsaturated monomer or monomers. Examples of such other monomers include the mono- and polyethylenically unsaturated monomers such as, for example, styrene, alpha-methylstyrene, allyl alcohol, vinyl acetate, maleic acid or anhydride, acrylic and methacrylic acids and their alkyl esters, monoolefins, diolefins, vinyl halides as vinyl chloride, allyl esters of monocarboxylic acids, vinyl pyridines, acrylamide, vinyl pyrrolidinone, allylamine, and methacrylonitrile and acrylonitrile, and mixtures thereof. These dissimilar monomers preferably take up from .1% to 50% by weight of the mixture of monomers. As used herein the expression "copolymer" is meant to include the polymerization products containing units of the third, fourth, etc. monomers.

The new copolymers may be prepared by a variety of suitable methods. They may be prepared, for example, by contacting the monomers with a free radical yielding catalyst at low temperatures, e.g., temperatures below about 30° C., by exposing the monomers to high energy ionizing radiation, and by contacting the monomers with redox catalyst system.

In those cases where high energy ionization is employed for the copolymerization, it is preferred to employ high energy electrons, protons and photons. Total dosage preferably employed ranges from about $10^5$ to $5 \times 10^6$ rads. A rad is defined as 100 ergs of ionizing energy absorbed per gram of irradiated mixture. The dosage rate preferably varies from about $10^4$ to $10^{12}$ rads per hour. Temperatures employed preferably vary from about 0° C. to 100° C.

The new copolymers are preferably prepared by polymerizing the monomers in an aqueous system using a redox polymerizing catalyst system, i.e., a free radical catalyst and a reducing agent. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl perphthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may be any of the various types of reducing agents. Examples of these include the organic sulfur compounds, such as sulfonic acids or their salts, alpha-oxysulfones, sulfoxylates, alpha-aminosulfones, thioethers which are preferably substituted by a hetero atom such a nitrogen in alpha position, or mercaptans with the simultaneous presence of labile halogen, mono or polyvalent aliphatic alcohols, beta-mercaptoethanol, levulinic acid, dicyandiamidine, thiobarbituric acid, sulfur dioxide or water-soluble sulfur compounds, and particularly the sulfur dioxide or bisulfite derivatives of previously formed polymers of acrolein. Especially preferred reducing agents to be employed include the sulfur dioxide adducts of polyacroleins having an intrinsic viscosity of at least 0.3 dl/g. and prepared by polymerizing acrolein in a redox catalyst system as described from the preparation of the copolymers of the present invention.

Salts of multivalent metals may also be used as reducing agents in the present process, but their presence is less preferred than the above-described types. By multivalent metal is meant one that can change its valency state reversibly. Examples of such metals include, among others, iron, manganese, copper, vanadium, cobalt, nickel, tin, silver, titanium, etc. When added to the reaction mixture, the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

The amount of the reducing agent employed will vary depending on the amount of the peroxide catalyst employed. It is preferred to have from about .3 mol to 1.5 mol of reducing agent per mol of peroxide catalyst. Preferably, the reducing agent is employed in an amount varying from about .5 to 1 mol per mol of peroxide.

Particularly good results are obtained when an anticoalescent agent is included in the reaction mixture. The presence of such materials brings about an increase in rate of copolymerization and maintenance of high molecular weight. The agent may be a cationic, anionic or non-ionic material and have a great variety of different compositions. Preferred materials include the ionic agents and especially those having a polar structure including a hydrophobic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, and stearate, ammonium stearate, etc., as well as the surface active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfonates or sulfates, such as sodium and/or potassium lauryl sulfate, allyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulfonated long-chain hydrocarbons, or sulfonated long-chain fatty acids, such as sulfonated oleic acid and the sodium, potassium and ammonium salts of sulfated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of these include, among others, the polyethylene glycol ethers of sorbitan or mannitan monolaurate, monopalmitate, monooleate or monostearate. Other examples include the polyethylene glycol ethers or pentaerythritol mono and dipalmitate, pentaerythritol mono- and distearate, trimethylolpropane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bisphenol-A, resorcinol, and the like, and mixtures thereof.

Other examples include di- and monoethers of polyhydric compounds and particularly the polyalkylene glycols. Especially preferred are the aryl and alkaryl poly-ethylene glycol ethers, such as phenyl polyethylene glycol monoether, xylylpolyethylene glycol monoether, alkyl phenyl polyalkylene glycol ethers, such as nonyl phenyl polyethylene glycol ether, isopropylphenyl polyethylene glycol monoether and the like.

In operating the process, all of the ingredients may be added at one time or one or more of the ingredients added to the reactor at a later time or intermittently or continuously throughout the reaction. It is desirable in many cases, and particularly in those cases where one of the monomers polymerize much faster than the other, to add one or more of the monomers intermittently or continuously throughout the reaction. The monomers may be added so as to keep the ratio of concentration of the monomers substantially constant or as to vary the ratio of concentrations as desired. Copolymers which have substantially homogeneous compositions are particularly desired.

The temperature employed in the process may vary over a considerable range. It is generally preferred to employ relatively low temperatures. In general, temperatures will vary from the freezing point of the reaction mixture to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction mixture.

The process may be conducted batchwise or on a semicontinuous or continuous scale.

The copolymers may be recovered from the reaction mixture in a great variety of different ways as by filtration, centrifugation, extraction and the like.

The new copolymers have substantially high molecular weights. They will preferably have intrinsic viscosities of at least 0.3 and preferably 0.5 to 5.0 dl/g. These values are determined by the conventional technique of polyelectrolyte (e.g. $Na_2SO_4$) viscosity measurements at 25° C. On a mol weight basis, such polymers have molecular weights ranging preferably from about 25,000 to 10,000,000 as determined by the light scattering technique. The preferred products have intrinsic viscosities ranging from 0.5 dl/g. to 3.5 dl/g.

The new copolymers possess a plurality of side chains containing the quaternary ammonium group and the anion.

The new copolymers are also characterized by the fact that they contain free aldehyde groups or potentially free aldehyde groups. Some of the aldehyde groups will appear in hydrated form so that the polymer may contain units such as

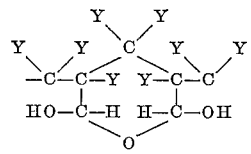

and

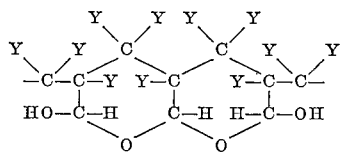

wherein Y is hydrogen or an organic radical and preferably a hydrocarbon radical as an alkyl, cycloalkyl, alkenyl or aryl radical containing up to 8 carbon atoms.

The copolymers of the present invention possess many new and unobvious properties and as a result find application in a great many fields. In solid form, for example, they may be molded and formed into attractive plastic articles or blended or added as additives to other polymeric materials as polystyrenes, polyethylenes, polyacrylates, polycarbonates, epoxy resins and the like.

The new copolymers have been found to be particularly useful in solution. The water-insoluble copolymers can be put into solubilized form by a variety of methods. This is preferably accomplished by suspending the copolymer in an aqueous medium containing a water-solubilizing agent, such as, for example, sulfur dioxide or an alkali bisulfite. The amount of the polymer added will vary depending upon the particular agent involved and the concentration of the agent. In general, it is preferred to add from 1 to 50 parts of the polymer per 100 parts of water. The concentration of the solubilizing agent may vary over a wide range depending on the type of product desired. In general, the amount will vary from about 1% to 25%. Stirring and heating may be applied to assist in the dissolution. The temperatures employed will generally vary from about 20° C. to about 90° C. Various other means, such as addition of small amounts of acid catalyst or the addition of swelling agents as acetone, or tetrahydrofuran may also be employed to assist in the dissolution.

The above-described water-soluble derivatives will have substantially the same molecular weight as the water-insoluble basic polymer. In the case of the sulfur dioxide and bisulfite dissolved polymer, the derivative will contain a plurality of free sulfonic acid groups (or sulfonate groups in case of neutralization or reaction with salt forming materials) in the polymer molecule. Such products, will, for example, contain groups such as

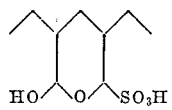

(the backbone of the polymer is as described above).

These solubilized copolymers are particularly useful and valuable alone or with catalysts for the treatment of fibrous materials as they tend to improve the properties, such as a strength, crease resistance, fold endurance, and the like thereof. Materials that may be treated include, among others, textile fabrics and fibers, leather, paper, and the like. When used for the treament of paper, these new water-soluble produces impart improved fold endurance and improve wet strength thereto.

The new water-soluble derivatives may be employed for treatment of fibrous materials in a variety of ways. They are preferably employed as aqueous solutions when applied to the paper. The concentrations of the solutions preferred for this application preferably vary from about 0.1% to 5% aqueous solution. Especially preferred concentrations vary from about .5% to 2.5% by weight.

The water solutions used in the treatment of the fibrous material preferably have a pH of from 2 to 7. Particularly superior results are obtained, both in the dipping process and in the wet end treatment, by adding a polyvalent metal salt, such as, for example, aluminum sulfate, zinc sulfate and the like to the bath containing the new copolymer derivatives. When this technique is employed, higher wet strength retention values are generally obtained as compared to those obtained by using the usual procedure without the added salts.

Emulsifying agents, water-dispersible binding colloids, plasticizers, anti-oxidants, dyes, fillers, curing agents, etc. may also be included in the aqueous system, but are not essential to obtaining the results set out about.

As indicated above, the aqueous system containing the new derivatives may be applied to the fibrous materials in any suitable way. If it is desired to apply the solution only to one surface of the material, as, for example, when it is desired to treat the back only of a fabric or paper having a face of a different material, the application may be effected by spraying as a liquid or gas or by means of rollers, or the composition may be spread upon the surface by means of a doctor blade. When, however, it is desirable to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

In the case of paper, the copolymer derivatives or solutions thereof may be added at any stage during the wet end preparation. By end is meant any stage from the time the pulp is added to the water to the time when the pulp makes up more than the water. It is preferred to employ a new copolymer derivative directly on the finished paper.

If one adds the new copolymer derivatives during the beater stage, the beater operations may be any of those now used for this purpose. One merely needs to pour or otherwise add the solubilized polymer solution directly to the aqueous suspension of pulp either all at once or intermittently over a short period of time. The solid polymer derivatives may also be added directly at this stage.

If the aqueous system is to be applied to the finished paper, it may be added by spraying, by rollers, by dipping or by running the paper through a conventional-type padding apparatus. Amount of pick-up will vary, but in most cases vary from about 50% to 100% based on the weight of the paper.

After the aqueous solution has been applied to the fibrous material as indicated above, the treated product is dried to effect the cure. The drying may be accomplished by merely rolling or squeezing off the excess solution and then setting the treated product out in the air to dry, or by use of forced air. Temperatures used in the drying may vary from about room temperature, e.g., about 20° C. to 100° C. The period of drying will depend largely on the amount of pick-up and concentration of the polymer solution. In most instances, drying period of from about 1 to 30 minutes should be sufficient.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like, as well as synthetic materials which include those prepared from polyamides, polyesters, polymers of vinyls, such as acrylonitrile, vinyl chloride, and the like.

The process is particularly suited for use in treating paper to improve properties, such as wet strength, burst strength, fold endurance and the like. Examples of such paper include, for example, those prepared from wood, cotton, linen, hemp, jute, mulberry, straw, bamboo, fibers or mixtures thereof, by any of the known processes, such as the sulfate process, soda process, sulfite process and the like. The new copolymers are particularly suited for use in treating sulfite paper. The paper may be colored or white and may be further treated for special applications, and the paper may be pretreated with other resins and the like before application of the new copolymers.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper paper or containers for food.

The new copolymer derivatives of the invention are also useful for the treatment of fibers and fabrics as in the capacity of warp sizing agents and crease proofing materials, and as adhesives for cellulosic materials as wood, paper, sheets and the like.

The new copolymers of the invention are also useful for the treatment of leather goods as tanning agents. The new copolymers are effective for all kinds of leather, such as goat skin, calf skin, horse hides and the like.

The new copolymers may also be used to form valuable esters, amides, imides, ethers and polyurethane derivatives.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

*Example I*

This example demonstrates the preparation and use of a copolymer of acrolein and trimethyl allyl ammonium chloride.

To 750 parts of deionized water was added 10 parts of a 4.3% aqueous solution of a preformed polyacrolein-sulfur dioxide adduct (having an I.V. of about 0.1 dl/g.) as reducing agent and .5 part of a nonyl phenol-ethylene oxide adduct. To this mixture was added 30 parts of trimethyl allyl ammonium chloride. To this mixture was added 200 parts of acrolein and 40 parts of an 0.05% solution of tertiary butyl hydroperoxide. The temperature was kept at 25–30° C. for several hours. At the end of that time, the reaction mixture was filtered to recover a white solid copolymer which was insoluble in water and had an intrinsic viscosity of 0.85 dl/g. The copolymer contained about 3% by weight of the allyl trimethyl ammonium chloride units.

The above-described copolymer was slurried with aqueous sulfur dioxide to form a water-soluble polysulfonic acid derivative. 1% and 2% water solutions of the derivatives were formed and used to treat kraft paper by dip impregnation.

The solution of the polysulfonic acid derivative prepared above was diluted with water to form 0.5%, 1% and 2% solutions. Sheets of kraft paper were then passed into and through the solutions. The treated sheets were pressed out on dry paper and allowed to dry at room temperature. The resulting products had the appearance, feel and flexibility of the untreated paper, but demonstrated improvement in fold endurance, dimensional stability and improved wet strength.

*Example II*

This example illustrates the preparation and use of a copolymer of acrolein and dimethyl allyl ammonium ethyl methacrylate-chloride.

750 parts of water was combined with 10 parts of a 4% solution of a preformed polyacrolein-sulfur dioxide adduct and 0.5 part of a nonyl phenol-ethylene oxide adduct. To this mixture was added 30 parts of trimethyl allyl ammonium chloride. The reactor was flushed with nitrogen and 180 parts of arolein added. 40 parts of an 0.5% solution of tertiary butyl hydroperoxide was added and the mixture kept at 25° C. for several hours. At the end of that time, the reaction mixture was filtered to recover a white solid copolymer. The copolymer was insoluble in water and had an intrinsic viscosity of about 0.8 dl/g. and contained about 3% of the methacrylate units.

The above-described copolymer was slurried with aqueous sulfur dioxide to form a water-soluble polysulfonic acid derivative. 1% and 2% water solutions of the derivative were formed and used to treat kraft paper as in Example I. The treated paper had improved strength.

*Example III*

This example illustrates the preparation and use of a copolymer of acrolein and 4-vinyl N-methylpyridinium methosulfate.

700 parts of water was combined with 10 parts of 4% solution of polyacrolein-sulfur dioxide adduct and 0.5 part of nonyl phenolethylene oxide adduct. The reactor was flushed with nitrogen and 200 parts of acrolein, 40 parts of 0.5% solution of tertiary butyl hydroperoxide added. 10 parts of 4-vinyl N-methylpyridinium methosulfate in 10 parts of water was added and the mixture kept at 25° C. for several hours. The resulting product was a solid high molecular weight copolymer insoluble in water.

The above-described copolymer was slurried with aqueous sulfur dioxide to form a water-soluble polysulfonic acid derivative. 1% and 2% water solutions of the derivature were formed and used to treat kraft paper as in Example I. The treated paper had improved strength.

*Example IV*

This example illustrates the preparation and use of a copolymer of acrolein and 2-(trimethylammoniummethyl) methacrylate methosulfate.

700 parts of water was combined with 10 parts of 4% polyacrolein-sulfur dioxide adduct and .1 part of phenolethylene oxide adduct. The reaction flask was flushed with nitrogen and then 170 parts of acrolein added with 40 parts of an 0.05 M solution of tertiary butyl hydroperoxide. After 40 minutes at 25° C., 30 parts of 2-(trimethylammoniummethyl) methacrylate methosulfate was added and the reaction continued for 24 hours. The reaction mixture was filtered to recover a white water-insoluble high molecular weight solid copolymer.

The above-described copolymer was slurried with aqueous sulfur dioxide to form a water-soluble polysulfonic acid derivative. 1% and 2% water solutions of the derivative were formed and used to treat kraft paper as in Example I. The treated paper had improved strength.

*Example V*

This example illustrates the preparation and use of a copolymer of acrolein and S-allyl (allylthiuronium) bromide.

700 parts of water, 10 parts of 4% polyacrolein-sulfur dioxide adduct, 1 part of nonyl phenol-ethylene oxide adduct. The reaction flask was flushed with nitrogen for 2 hours. 185 parts of acrolein was then added along with 40 parts of 0.05% M solution of tertiary butyl hydroperoxide. After a few minutes, 15 grams of the S-allyl (allylthiuronium) bromide was added and the reaction kept at 25° C. for several hours. The product was filtered to recover a white solid water-insoluble copolymer having an I.V. of 1.6 and containing about one S-allyl (allylthiuronium) bromide unit per 124 acrolein units.

The above described new copolymer was dissolved in aqueous sulfur dioxide to form a water-soluble sulfonic acid derivative. This derivative was used to treat bleached kraft paper to improve strength and abrasion resistance. In this experiment, a 2% water solution of the sulfur dioxide adduct was prepared and the paper passed into and through the solution. The paper was then dried at room temperature. The resulting product had the appearance and feel of the untreated paper but demonstrated improvement in strength and abrasion resistance.

*Example VI*

This example illustrates the preparation and use on paper of a copolymer of acrolein and dimethyl diallyl ammonium methosulfate.

700 parts of water, 1 part of nonyl phenol-ethylene oxide adduct was added to a reaction flask and the flask flushed with nitrogen. 10 parts of 4% polyacrolein sulfur dioxide adduct was added and 185 parts of acrolein stirred into the mixture. 50 parts of 0.05 M tertiary butyl hydroperoxide was added. After a few minutes 15 parts of dimethyl diallyl ammonium methosulfate was added in 50 parts of water. The mixture was kept at 25° C. for 24 hours. The mixture was then filtered to recover a white water-insoluble solid copolymer. The product had an intrinsic viscosity of 1.3 dl/g. Analysis indicated the product had one ammonium unit for about 75 units of acrolein.

The above described copolymer was dissolved in aqueous sulfur dioxide to form a water-soluble sulfonic acid derivative. This derivative was used to treat bleached kraft paper to improve strength. In this experiment, a 2% water solution of the sulfur dioxide adduct was prepared and the paper passed into and through the solution. The paper was then dried at room temperature. The resulting product had the appearance and feel of the untreated paper but demonstrated improvement in strength and abrasion resistance.

*Example VII*

Example VI was repeated with the exception that the acrolein and the dimethyl diallyl ammonium methosulfate were used in a ratio of 170 to 30, and the mixture kept at 25° C. for 40 hours. The resulting product had an intrinsic viscosity of 0.9 and demonstrated good wet strength properties on kraft paper.

*Example VIII*

The preceding example was repeated with the exception that the components were used in a ratio of 190 to 10. The resulting product had an intrinsic viscosity of 0.8 dl/g. The polysulfonic acid derivative obtained by dissolving the copolymer in aqueous sulfur dioxide was a promising wet strength agent for kraft paper.

*Example IX*

This example illustrates the preparation and use of a copolymer of acrolein and N-methyl-2-vinylpyridinium methosulfate.

700 parts of water was combined with 1 part of phenol-ethylene oxide adduct in a glass reactor. The reactor was flushed with nitrogen and then 10 parts of polyacrolein-sulfur dioxide adduct added. To the stirred mixture was added 185 parts of acrolein, 40 parts of 0.5 M solution of tertiary butyl hydroperoxide and the mixture stirred for a few minutes. Then 15 parts of the N-methyl 2-vinylpyridinium methosulfate was added in 50 parts of water and the mixture kept at 25° C. for several hours. At the end of the reaction, the mixture was filtered to recover a solid white water-insoluble copolymer. Analysis indicated it had an intrinsic viscosity of 1.1 dl/g. and contained about one pyridinium unit per 250 acrolein units.

*Example X*

The preceding example was repeated with the exception that the acrolein and methosulfate monomer was used in a ratio of 170 to 30. The resulting copolymer was employed on kraft paper as shown in Example I and the resulting properties had improved strength.

*Example XI*

This example illustrates the preparation and use of a copolymer of acrolein and N-methyl-4-vinylpyridinium methosulfate.

700 parts of water was combined with 1 part of phenolethylene oxide adduct in a glass reactor. The reactor was flushed with nitrogen and then 10 parts of polyacrolein-sulfur dioxide adduct added. To this stirred mixture was added 185 parts of acrolein, 40 parts of tertiary butyl hydroperoxide. The temperature was kept at 25–30° C. for several hours. At the end of that time, the mixture was filtered to recover a white solid copolymer. The product had an intrinsic viscosity of 0.5 dl/g. The copolymer was made up of 93% acrolein and 7% the methosulfate monomer unit.

The product was dissolved in aqueous sulfur dioxide and applied to kraft and rag paper as in Example I. The treated paper showed a 34% retention of tensile and 32% retention of burst on rag paper and 23% retention of kraft.

*Example XII*

This example illustrates the preparation and use of a copolymer of acrolein and S-methyl(allyl thiuronium) methosulfate.

700 parts of water, 1 part of nonyl-phenyl-ethylene oxide adduct was added to a reaction flask and the flask flushed with nitrogen. 10 parts of a 4% polyacrolein-sulfur dioxide adduct was added and 185 parts of acrolein stirred into the mixture. 40 parts of an 0.05 M aqueous solution of tertiary butyl hydroperoxide was added, after a few minutes 15 parts of the S-methyl(allyl thiuronium) methosulfate added. The mixture was kept at 25° C. for about 48 hours. The resulting product was filtered to recover a white solid water-insoluble copolymer having an intrinsic viscosity of 1.0. Analysis indicated there was about one methosulfate unit per 144 acrolein units.

The above described copolymer was dissolved in aqueous sulfur dioxide to form a water-soluble polysulfonic acid derivative. This derivative was used to treat kraft paper to impart strength thereto.

*Example XIII*

Example XII is repeated with the exception that the S-methyl (allyl thiuronium) methosulfate is replaced with S-allyl thiuronium bromide. A white solid copolymer is obtained.

We claim as our invention:

1. A copolymer of an alpha, beta-unsaturated aldehyde containing up to 8 carbon atoms and an ethylenically unsaturated monomer possessing a quaternary ammonium group and selected from the group consisting of (1) compounds of the formula

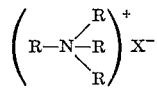

wherein one R is a member of the group consisting of hydrocarbon radicals, ester-substituted hydrocarbon radicals and ether-substituted hydrocarbon radicals, all of the aforegoing members containing an ethylenic group, and the remaining R's being free of carbon-to-carbon unsaturation and being a member of the group consisting of hydrocarbon radicals, ester-substituted hydrocarbon radicals and ether-substituted hydrocarbon radicals, and X is an anion, and (2) compounds of the formula

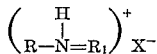

wherein R is a member of the group consisting of hydrocarbon radicals, ester-substituted hydrocarbon radicals and ether-substituted hydrocarbon radicals all of the aforegoing members containing an ethylenic group, and $R_1$ is free of carbon-to-carbon unsaturation and is a member of the group consisting of hydrocarbon radicals and radicals of the structure

wherein $R_2$ is a hydrocarbon radical, and X is an anion, each of the foregoing unsaturated monomers possessing a quaternary ammonium group having a total of not more than 24 carbon atoms.

2. A water insoluble copolymer of acrolein and an ethylenically unsaturated quaternary ammonium compound selected from the group consisting of (1) compounds of the formula

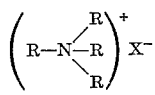

wherein one R is a member of the group consisting of hydrocarbon radicals, ester-substituted hydrocarbon radicals and ether-substituted hydrocarbon radicals, all of the aforegoing members containing an ethylenic group, and the remaining R's being free of carbon-to-carbon unsaturation and being a member of the group consisting of hydrocarbon radicals, ester-substituted hydrocarbon radicals and ether-substituted hydrocarbon radicals, and X is an anion, and (2) compounds of the formula

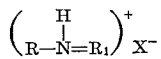

wherein R is a member of the group consisting of hydrocarbon radicals, ester-substituted hydrocarbon radicals and ether-substituted hydrocarbon radicals all of the aforegoing members containing an ethylenic group, and $R_1$ is free of carbon-to-carbon unsaturation and is a member of the group consisting of hydrocarbon radicals and radicals of the structure

wherein $R_2$ is a hydrocarbon radical, and X is an anion, each of the foregoing unsaturated monomers possessing a quaternary ammonium group having a total of not more than 24 carbon atoms.

3. A copolymer as in claim 2 wherein the product has an intrinsic viscosity between 0.1 dl/g. and 2.5 dl/g.

4. A copolymer as in claim 2 wherein the quaternary ammonium compound is an alkenyl trialkyl ammonium bromide having a total of not more than 24 carbon atoms.

5. A copolymer as in claim 2 wherein the quaternary ammonium compound is trihydrocarbyl ammonium alkyl alkenoate sulfate.

6. A copolymer as in claim 2 wherein the unsaturated aldehyde makes up from 10% to 99.5% of the copolymer.

7. A copolymer as in claim 2 wherein the acrolein makes up from 95% to 45% by weight of the copolymer.

8. A water-soluble polysulfonic acid obtained by reacting a copolymer of acrolein and allyl trialkyl ammonium chloride containing a total of from 6 to 24 carbon atoms with sulfur dioxide.

9. A water solution of the water-soluble polysulfonic acid defined in claim 8.

10. A water-soluble polysulfonic acid obtained by reacting a copolymer of acrolein and 2(N-allyl dimethylammonium) ethyl methacrylate hydrocarbon sulfonate having a total of from 6 to 24 carbon atoms with sulfur dioxide.

11. An amonic water-soluble polysulfonic acid derivative of a copolymer of acrolein and S-allyl thiuronium bromide.

12. A copolymer of acrolein and methallyl dimethyl vinyl-phenyl ammonium chloride.

13. A process for preparing a copolymer of an alpha, beta-ethylenically unsaturated aldehyde containing up to 8 carbon atoms and an ethylenically unsaturated monomer possessing a quaternary nitrogen atom and selected from the group consisting of (1) compounds of the formula

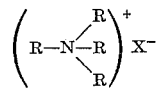

wherein one R is a member of the group consisting of hydrocarbon radicals, ester-substituted hydrocarbon radicals and ether-substituted hydrocarbon radicals, all of the aforegoing members containing an ethylenic group, and the remaining R's being free of carbon-to-carbon unsaturation and being a member of the group consisting of hydrocarbon radicals, ester-substituted hydrocarbon radicals and ether-substituted hydrocarbon radicals, and X is an anion, and (2) compounds of the formula

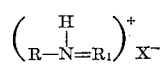

wherein R is a member of the group consisting of hydrocarbon radicals, ester-substituted hydrocarbon radicals and ether-substituted hydrocarbon radicals all of the aforegoing members containing an ethylenic group, and $R_1$ is free of carbon-to-carbon unsaturation and is a member of the group consisting of hydrocarbon radicals and radicals of the structure

wherein $R_2$ is a hydrocarbon radical, and X is an anion, each of the foregoing unsaturated monomers possessing a quaternary ammonium group having a total of not more than 24 carbon atoms, which comprises contacting a mixture of the monomers in an aqueous system with a peroxide catalyst and a reducing agent.

14. A process for preparing a copolymer of acrolein and an unsaturated quaternary ammonium compound selected from the group consisting of (1) compounds of the formula

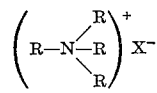

wherein one R is a member of the group consisting of hydrocarbon radicals, ester-substituted hydrocarbon radicals and ether-substituted hydrocarbon radicals, all of the aforegoing members containing an ethylenic group, and the remaining R's being free of carbon-to-carbon unsaturation and being a member of the group consisting of hydrocarbon radicals, ester-substituted hydrocarbon radicals and ether-substituted hydrocarbon radicals, and X is an anion, and (2) compounds of the formula

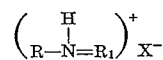

wherein R is a member of the group consisting of hydrocarbon radicals, ester-substituted hydrocarbon radicals and ether-substituted hydrocarbon radicals all of the aforegoing members containing an ethylenic group, and $R_1$ is free of carbon-to-carbon unsaturation and is a member of the group consisting of hydrocarbon radicals and radicals of the structure

wherein $R_2$ is a hydrocarbon radical, and X is an anion, each of the foregoing unsaturated monomers possessing a quaternary ammonium group having a total of not more than 24 carbon atoms which comprises contacting a mixture of the monomers in an aqueous medium with a peroxide catalyst and a reducing agent at a temperature below about 60° C.

References Cited by the Examiner
UNITED STATES PATENTS

| | | | |
|---|---|---|---|
| 2,676,166 | 4/1954 | Webers | 260—85.7 |
| 2,843,573 | 7/1958 | Melamed | 260—86.1 |
| 2,884,057 | 4/1959 | Wilson et al. | 162—164 |
| 2,884,058 | 4/1959 | Schuller et al. | 162—168 |
| 2,893,979 | 7/1959 | Chapin et al. | 260—73 |
| 2,923,701 | 2/1960 | Schuller et al. | 260—85.5 |
| 2,940,955 | 6/1960 | Shokal et al. | 260—73 |
| 2,984,639 | 5/1961 | Stamberger et al. | 260—32.4 |
| 3,079,280 | 2/1963 | Houff et al. | 117—139.5 |
| 3,079,296 | 2/1963 | Houff et al. | 162—168 |

SAMUEL H. BLECH, *Primary Examiner.*

LEON J. BERCOVITZ, WILLIAM H. SHORT,
*Examiners.*

L. M. MILLER, *Assistant Examiner.*